J. M. CURTISS.
FISHING TACKLE.
APPLICATION FILED NOV. 2, 1906.

958,233.

Patented May 17, 1910.

Witnesses:
A. L. Lord
R. Otruss

Inventor.
James M. Curtiss,
by Bluford W. Brockett
Attorney.

UNITED STATES PATENT OFFICE.

JAMES M. CURTISS, OF CLEVELAND, OHIO.

FISHING-TACKLE.

958,233.  Specification of Letters Patent.  Patented May 17, 1910.

Application filed November 2, 1906. Serial No. 341,701.

*To all whom it may concern:*

Be it known that I, JAMES M. CURTISS, residing at Cleveland, in the county of Cuyahoga and State of Ohio, have invented a certain new and useful Improvement in Fishing-Tackle, of which the following is a full, clear, and exact description, reference being had to the accompanying drawings.

The invention relates to a combined hook, sinker, spinner and swivel in a single piece of apparatus arranged in a manner such that when it is in the water the current will tend to hold it in a more or less rigid position whereby the spinner may spin freely without wear to the parts, and whereby the hook itself is not easily knocked to one side by a "strike" from the fish.

The invention may be further briefly summarized as consisting in construction and combination of parts hereinafter set forth in the following descriptions, drawings and claims.

Figure 1:
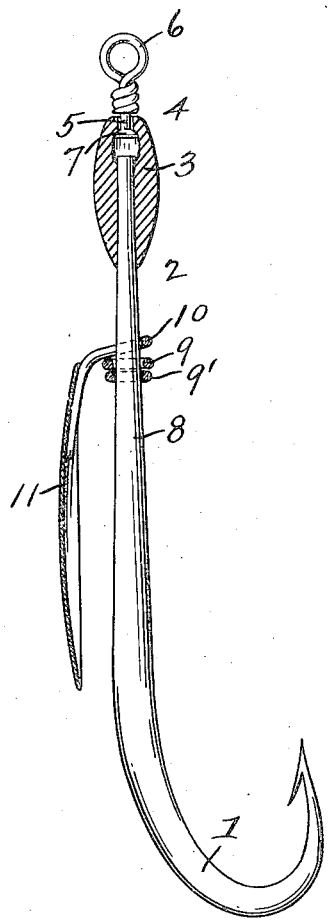
Figure 2:
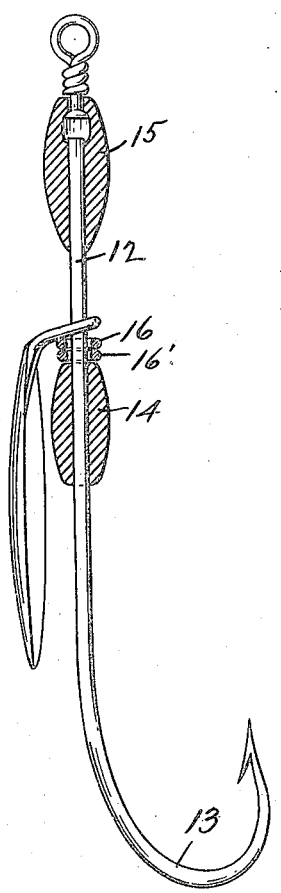

Referring to the drawings Figure 1 is a side elevation of my device with portions thereof broken away to more clearly show the construction thereof, and Fig. 2 is a like view of a modification of the invention.

Referring to the drawing 1 represents a hook, the shank 2 of which is provided with a combined sinker and swivel 3 secured thereto in any preferred manner. This swivel 3 has at its upper end an opening 4 which receives a shank 5 of an eye 6 to which the line may be secured. The end of this shank 5 is provided with a head 7 within the sinker 3. In Fig. 1 the shank of the hook is increased in size as shown whereby a ring 9' may be jammed against its inclined sides and held from passing down to the hook 1 as shown. This ring is adapted to support and hold in place the spinner ring 10 which carries a spinner plate 11 and another ring 9. From this construction it will be seen that when the hook is secured to the line and is cast into the water the weight of the sinker 3 will cause the hook to sink toward the bottom of the stream. If this sinker should not be sufficient an additional sinker may be supplied to the line in the usual way. In any event, however, when the hook sinks below the surface of the water it will assume substantially the alinement of the line and will be held rigid so that the spinner rotates freely upon the shank of the hook.

In modification shown in Fig. 2 the shank 12 of the hook 13 is provided with an additional sinker 14 which adds to the effect of the sinker 15 at the top and also forms a stop for the ring 16 and 16'.

It will be seen that since the spinner rotates upon the metallic shank of the hook and against the ring 9, it will revolve freely without any great amount of wear to the parts and with slight motion either of the water or the line.

Having described my invention, I claim:

1. In a fishing tackle, in combination, a hook having a long rigid shank, a sinker member on the end of the shank, a fastening loop swiveled in said sinker member, and a second sinker member on said shank a short distance below the sinker member at the end of the shank, a spinner adapted to rotate about the shank between said sinker members and said second sinker member having a stop against which the spinner may operate.

2. In a fishing tackle, in combination, a hook having a long rigid shank provided with a sinker member secured to the end of said shank, a fastening loop swiveled in said sinker member, a second sinker member secured to the shank below the first sinker members, and a spinner mounted on said shank between said sinker members and adapted to rotate above the curve and point of the hook.

3. In fishing tackle, in combination, a hook having a long rigid shank, a stop ring upon said shank, a sinker below said stop ring, a spinner mounted upon said shank above said stop ring, a member secured to the end of said shank, and a fastening loop swiveled in said member.

4. In fishing tackle, in combination, a hook having a long rigid shank, a sinker secured to said shank, a stop ring engaging said shank, a spinner upon said shank, above said stop ring, a sinker at the end of said shank, and a loop swiveled in said sinker at the end of said shank.

5. In a fishing tackle, in combination, a hook having a long shank, a sinker member secured to the end of the shank, a loop swiveled in said sinker member, a stop ring upon said shank below said sinker member, said shank having means for limiting the movement of said stop ring in the direction of the curve of the hook, and a spinner mounted on said shank between said sinker member and said stop ring and adapted to rotate about said shank above the point and curve of the hook.

In testimony whereof I affix my signature in the presence of two witnesses.

JAMES M. CURTISS.

Witnesses:
B. W. BROCKETT,
R. WEISS.